US012123249B2

(12) United States Patent
Hamm

(10) Patent No.: US 12,123,249 B2
(45) Date of Patent: Oct. 22, 2024

(54) INTEGRATED SLIDING GLASS PANEL BUMPERS

(71) Applicant: Aston Global, Inc., Garland, TX (US)

(72) Inventor: Steven Hamm, Wills Point, TX (US)

(73) Assignee: ASTON GLOBAL, INC., Garland, TX (US)

( * ) Notice: Subject to any disclaimer, the term of this patent is extended or adjusted under 35 U.S.C. 154(b) by 106 days.

(21) Appl. No.: 17/656,972

(22) Filed: Mar. 29, 2022

(65) Prior Publication Data

US 2023/0313586 A1 Oct. 5, 2023

(51) Int. Cl.

| | |
|---|---|
| ***E05F 5/02*** | (2006.01) |
| ***A47K 3/34*** | (2006.01) |
| ***E05D 15/06*** | (2006.01) |
| ***E05F 5/00*** | (2017.01) |
| ***E06B 3/02*** | (2006.01) |

(52) U.S. Cl.

CPC ................ *E05F 5/003* (2013.01); *A47K 3/34* (2013.01); *E05D 15/063* (2013.01); *E06B 3/02* (2013.01); *E05Y 2201/224* (2013.01); *E05Y 2201/684* (2013.01); *E05Y 2201/688* (2013.01); *E05Y 2600/452* (2013.01); *E05Y 2600/51* (2013.01); *E05Y 2600/632* (2013.01); *E05Y 2900/114* (2013.01)

(58) Field of Classification Search

CPC ........ E05F 5/0003; E05D 15/063; E06B 3/02; E05Y 2201/224; E05Y 2201/684; E05Y 2201/688; E05Y 2600/452; E05Y 2600/51; E05Y 2600/632; E05Y 2600/502; E05Y 2900/114; E05Y 2800/28; E05Y 2800/672

USPC ............................. 49/425, 409; 16/82; 4/410

See application file for complete search history.

(56) References Cited

U.S. PATENT DOCUMENTS

| | | | | |
|---|---|---|---|---|
| 3,100,916 | A * | 8/1963 | McKinney | E05D 15/0656 49/125 |
| 5,233,724 | A * | 8/1993 | Lei tert | E05F 5/003 160/202 |
| 5,242,222 | A * | 9/1993 | Michael | A47L 15/507 312/334.45 |
| 5,461,829 | A * | 10/1995 | Lehto | E05D 15/1021 49/225 |
| 5,718,083 | A * | 2/1998 | Dowdell, II | E05F 5/003 312/334.46 |
| 8,915,019 | B2 * | 12/2014 | Schachter | E05F 5/003 49/425 |
| 9,080,362 | B2 * | 7/2015 | Johnson | E05F 5/003 |
| 10,036,190 | B2 | 7/2018 | Minkovich et al. | |
| 10,961,756 | B2 * | 3/2021 | Cano | A47K 3/34 |
| 11,492,831 | B2 * | 11/2022 | Kao | E06B 3/4681 |
| 2004/0098831 | A1 * | 5/2004 | Elmer | E05D 15/063 16/89 |

(Continued)

FOREIGN PATENT DOCUMENTS

| | | | |
|---|---|---|---|
| CN | 207598671 U | * | 7/2018 |
| KR | 20180093697 A | * | 8/2018 |

*Primary Examiner* — Jerry E Redman

(74) *Attorney, Agent, or Firm* — KLEMCHUK PLLC

(57) ABSTRACT

Disclosed are integrated sliding glass panel bumper assemblies, frameless sliding glass panel systems that include one or more of the integrated sliding glass panel bumper assemblies, methods for installing the integrated sliding glass panel bumper assemblies, and methods for retrofitting a frameless sliding glass panel system with one or more of the integrated sliding glass panel bumper assemblies.

9 Claims, 8 Drawing Sheets

(56) References Cited

U.S. PATENT DOCUMENTS

| | | | | |
|---|---|---|---|---|
| 2014/0259366 | A1 | 9/2014 | Ball et al. | |
| 2023/0313586 | A1 * | 10/2023 | Hamm | E06B 3/02 49/404 |

* cited by examiner

INTEGRATED SLIDING GLASS PANEL BUMPERS

FIELD OF THE DISCLOSURE

The present disclosure generally relates to sliding glass panels, more particularly to the bumpers for the sliding glass panels.

BACKGROUND

Sliding glass panels can be used as doors for shower enclosures, tub/shower enclosures, and rooms. Sliding glass panels can be used in a frameless sliding panel design, and in the frameless design, a sliding glass panel can be coupled by rollers to a top rail, where the ends of the rail are connected to the walls. The glass panel and the coupled rollers can be configured to slide in a direction of a longitudinal axis of the rail so as to open and close access to the shower, tub/shower, or room. Wall-mounted bumpers can be mounted on the wall(s) to absorb shock of movement of a sliding glass panel. However, wall-mounted bumpers are included in sliding glass panel installation kits as separate pieces and are sometimes not installed, for example, to maintain a frameless aesthetic design or to avoid extra installation steps.

SUMMARY

Disclosed are integrated sliding glass panel bumper assemblies, frameless sliding glass panel systems that include one or more of the integrated sliding glass panel bumper assemblies, methods for installing the integrated sliding glass panel bumper assemblies, and methods for retrofitting a frameless sliding glass panel system with one or more of the integrated sliding glass panel bumper assemblies.

An integrated sliding glass panel bumper assembly comprising a plate, a rail sleeve coupled to a first portion of the plate, wherein the rail sleeve has a hollow interior that is configured to receive an end of a top rail of a frameless sliding glass panel system, and a bumper coupled to a second portion of the plate.

A frameless sliding glass panel system comprising a top rail, a sliding glass panel, a roller connected to the sliding glass panel and configured to move along the top rail, an integrated sliding glass panel bumper assembly connected to an end of the top rail, the integrated sliding glass panel bumper assembly having a plate, a rail sleeve coupled to a first portion of the plate, wherein the rail sleeve has a hollow interior that is configured to receive the end of the top rail, and a bumper coupled to a second portion of the plate, wherein the bumper is configured to dampen a movement of the first glass panel.

An integrated sliding glass panel bumper assembly comprising a first plate, a second plate having a first portion that is parallel to the first plate and a second portion that is perpendicular to the first plate, wherein the second portion has a side connected to a side of the first portion, a connector configured to couple the first plate to the first portion of the second plate such that a space is formed between the first plate and the first portion of the second plate, and a bumper coupled to the second portion of the second plate.

A frameless sliding glass panel system comprising a top rail, a sliding glass panel, a fixed glass panel, a roller connected to the sliding glass panel and configured to move along the top rail, an integrated sliding glass panel bumper assembly connected to a portion of the fixed glass panel, the integrated sliding glass panel bumper assembly comprising a first plate, a second plate having a first portion that is parallel to the first plate and a second portion that is perpendicular to the first plate, wherein the second portion has a side connected to a side of the first portion, a connector configured to couple the first plate to the first portion of the second plate such that a space is formed between the first plate and the first portion of the second plate, and a bumper coupled to the second portion of the second plate.

An integrated sliding glass panel bumper assembly comprising a first plate, a second plate that is parallel to the first plate, a bumper having a bumper portion connected to two mounting portions that are placed between the first plate and the second plate, and a connector configured to couple the first plate, the second plate, and the two mounting portions of the bumper such that a space or gap is formed between the two mounting portions. The integrated sliding glass panel bumper assembly can further include a connector placed through aligned holes that are formed in the first plate, the second plate, and each of the mounting portions of the bumper. The integrated sliding glass panel bumper assembly can also include a collar placed in the holes and configured for the connector to pass through the collar.

A frameless sliding glass panel system comprising a top rail, a sliding glass panel, a fixed glass panel, a roller connected to the sliding glass panel and configured to move along the top rail, an integrated sliding glass panel bumper assembly connected to a corner of the glass panel, the integrated sliding glass panel bumper assembly comprising a first plate, a second plate that is parallel to the first plate, a bumper having a bumper portion connected to two mounting portions that are placed between the first plate and the second plate, and a connector configured to couple the first plate, the second plate, and the two mounting portions of the bumper such that a space or gap is formed between the two mounting portions. The assembly is configured to receive a corner of the sliding glass panel in the space or gap, and the connected is configured to pass through a hole formed in the sliding glass panel.

A method for installing the integrated sliding glass panel bumper assembly can include attaching or securing a plate of the integrated sliding glass panel bumper assembly to a wall.

A method for retrofitting a frameless sliding glass panel system with an integrated sliding glass panel bumper assembly can include removing the top rail from a flange mount, removing the flange mount from the wall, and attaching or securing the plate of the integrated sliding glass panel bumper assembly to the wall.

Another method for retrofitting a frameless sliding glass panel system with an integrated sliding glass panel bumper assembly can include removing a glass clamp from a fixed glass panel of a frameless sliding glass panel assembly, securing attaching or securing the first plate and the first portion of the second plate of the integrated sliding glass panel bumper assembly to the fixed glass panel. In the method for retrofitting, the second plate has a first portion that is parallel to the first plate and a second portion that is perpendicular to the first plate, the second portion has a side connected to a side of the first portion, a connector is configured to couple the first plate to the first portion of the second plate such that the fixed glass panel is attached or secured in a space that is formed between the first plate and the first portion of the second plate, a bumper of the integrated sliding glass panel bumper assembly is coupled to the second portion of the second plate, or combinations thereof.

A method for installing an integrated sliding glass panel bumper assembly can include sliding two mounting portions of a bumper over a corner of a sliding glass panel, placing a first plate over one of the mounting portions, placing a second plate over the other of the mounting portions, and attaching or securing the mounting portions, the first plate, and the second plate to the corner of the sliding glass panel. Attaching or securing the assembly can include inserting a connector through a hole formed in the second plate, holes in the mounting portions, and hole in the sliding glass panel, wherein the holes collectively form a channel through which the connector is inserted, and securing the connector in the assembly.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Disclosed herein are embodiments of an integrated sliding glass panel bumper assembly, a frameless sliding glass panel system having one or more integrated sliding glass panel bumper assembly, and methods for installing the integrated sliding glass panel bumper assemblies. The integrated sliding glass panel bumper assembly has a bumper built into the mounting hardware for the top rail of a frameless sliding glass panel system so that installation of the bumper is not optional and is guaranteed, since installation of the mounting hardware is required for the frameless sliding glass panel system to operate.

Figure 1:
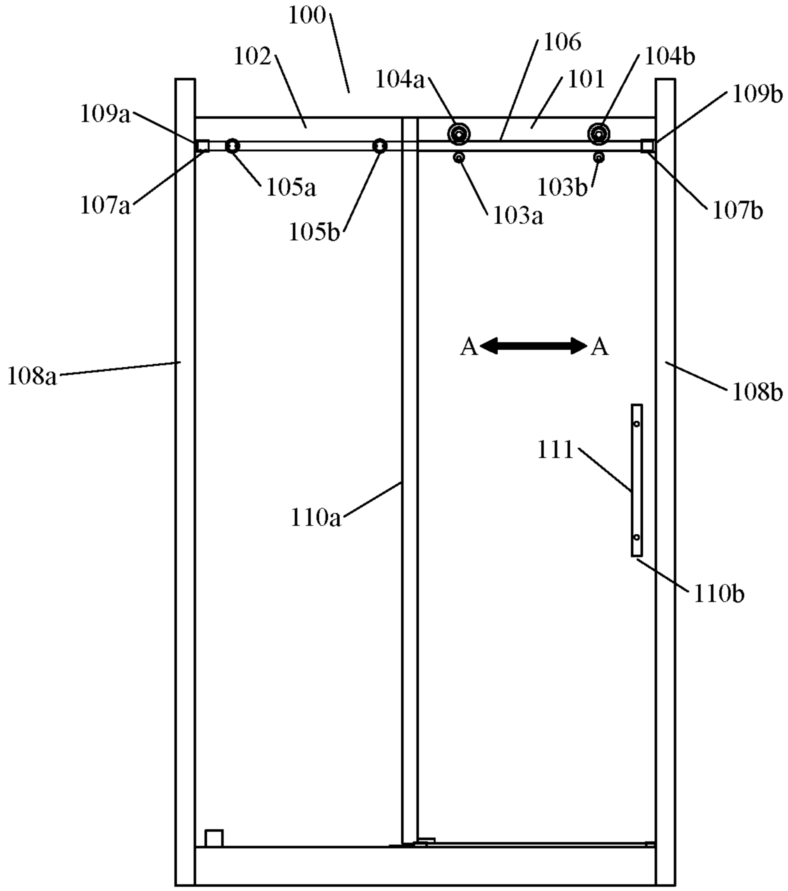
FIG. 1 illustrates a side perspective view of a frameless sliding glass panel system.

FIG. 1 illustrates a side perspective view of a frameless sliding glass panel system 100. The frameless sliding glass panel system 100 includes a sliding glass panel 101 and a fixed glass panel 102. The sliding glass panel 101 is attached to the top rail 106 by roller assemblies 103*a* and 103*b*. Rollers 104*a* and 104*b* of the roller assemblies 103*a* and 103*b*, respectively, roll or slide along a top surface of the top rail 106, such that the sliding glass panel 101 moves in one of the directions in arrows A-A (the sliding glass panel 102 moves horizontally to the left or to the right). The fixed glass panel 102 can be attached to the top rail 106 by a bracket or brace 105.

The view in FIG. 1 is from the inside of an enclosure or space formed by the glass panels 101 and 102 and the walls 108*a* and 108*b*. A person can use the handle 111 attached to the sliding glass panel 101 to move or slide the sliding glass panel 101. The sliding glass panel 101 moves or slides horizontally to open and close access to a space (e.g., shower, tub, room), and the fixed glass panel 102 is always stationary.

The top rail 106 has an end 107*a* attached to a first wall 108*a*, and the top rail 106 has an opposite end 107*b* attached to a second wall 108*b*. The top rail 106 can be attached to the walls 108*a* and 108*b* by any technique, such as by adhesive, screws, or other fasteners. In some embodiments, mounting flanges 109*a* and 109*b* can be used to attach the ends 107*a* and 107*b* of the top rail 106 to the walls 108*a* and 108*b*, respective.

The glass panels 101 and 102 in combination with the walls 108*a* and 108*b* form an enclosure that is the shower, tub, or room. The frameless sliding glass panel system 100 is frameless in the sense that: there is no track on top and no track on bottom of the glass panels 101 and 102 in which the sliding glass panel 101 moves and in which the fixed glass panel 102 sits; and there is no channel on the walls into which the sides of the glass panels 101 and 102 fit. Thus, when the sliding glass panel 101 moves horizontally in one of the directions of arrows A-A, the side 110*a* of the sliding glass panel 101 can collide with wall 108*a*, and the opposite side 110*b* of the sliding glass panel 101 can collide with wall 108*b*. Without a bumper to absorb the shock of the collision, which is the case when bumpers are not installed on the walls 108*a* and 108*b* to maximize the frameless aesthetics of the installation, the sliding glass panel 101 can shatter, causing serious injury or threat of injury to a person moving the sliding glass panel 101. Use of one or more of the integrated sliding glass panel bumper assemblies disclosed herein with the frameless sliding glass panel system 100 reduces the likelihood of glass shattering while maintaining the frameless aesthetic design of the system 100.

In embodiments, the top rail 106 can have a circular, square, triangular, rectangular, or other polygonal cross section; and the cross-sectional shape of the top rail 106 is not limited in scope herein. Similarly, the configuration of the roller assemblies 103*a* and 103*b* is not limited to that shown in FIG. 1, and various other designs can used in accordance with this disclosure. In embodiments, the frameless sliding glass panel system 100 can include various other clamps, flanges, brackets, or braces known in the art with the aid of this disclosure, such as a bottom brace or clamp for the fixed glass panel 102 that attaches the bottom of the fixed glass panel 102 to the floor or base of the enclosure or space.

It should be understood that embodiments of the frameless sliding glass panel systems disclosed herein can include a single glass panel, i.e., one sliding glass panel (e.g., glass panel 101) without a fixed panel; alternatively, frameless sliding glass panel systems disclosed herein can include multiple fixed glass panels, multiple sliding glass panels, or multiple fixed glass panels and multiple sliding glass panels. It should also be understood that walls 108*a* and 108*b* can be flat vertical surfaces of tile, stone, sheet rock, or wood, and the material or location of the walls 108*a* and 108*b* is not limited by the scope of this disclosure. For clarity of explanation, this disclosure may refer to shower walls when describing the embodiments of the disclosure.

FIGS. 2A to 2E illustrate various views of an embodiment of an integrated sliding glass panel bumper assembly 200. The integrated sliding glass panel bumper assembly 200 includes a plate 210, a rail sleeve 220 coupled to a first portion 211 of the plate 210, and a bumper 230 coupled to a second portion 212 of the plate 210. The plate 210 is configured to attach (or be attached) to a wall (e.g., wall 108*a* or 108*b*) of an enclosure or space, and the rail sleeve 220 is configured to receive an end of a top rail (e.g., end 107*a* or end 107*b* of top rail 106).

The plate 210 can generally be flat. The first portion 211 of the plate 210 can have a connector 213, embodied as a male threaded portion in FIG. 2E. The connector 213 can be configured to connect with an end 221 of the rail sleeve 220. The end 221 of the rail sleeve 220 can be configured with a connector, such as female threads formed on an inside surface of the rail sleeve 220, that is configured to connect with the connector 213 of the plate 210. In alternative embodiments, the connector 213 can have a female threaded portion configured to connect with the end 221 of the rail sleeve 220, and the end 221 of the rail sleeve 220 can be configured with a connector, such as male threads formed on an outside surface of the rail sleeve 220, that is configured to connect with the connector 213 of the plate 210. Other alternative embodiments contemplated that the connector 213 of the plate 210 and the connector of the rail sleeve 220 can have other types of connection (in alternative to threaded connection) such as friction fit arrangement, a holding pin, or a set screw (e.g., such as set screw 225). Yet other alternative embodiments contemplate that the plate 210 and rail sleeve 220 can be integrally formed, glued together, or welded together.

Figure 2A:
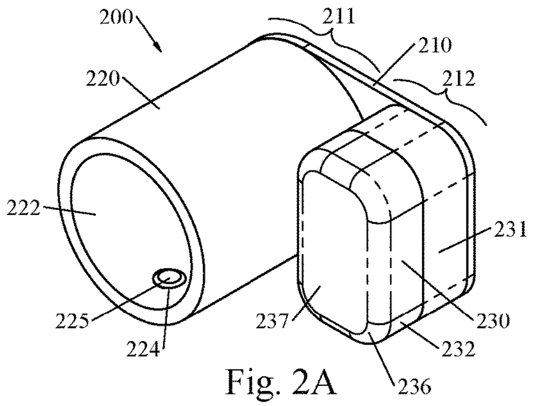
FIG. 2A illustrates a perspective view of an embodiment of an integrated sliding glass panel bumper assembly.
Figure 2B:
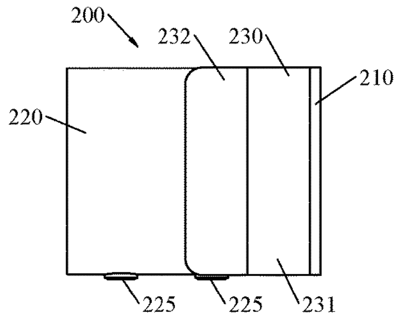
FIG. 2B illustrates a side elevational view of the integrated sliding glass panel bumper assembly of FIG. 2A.
Figure 2C:
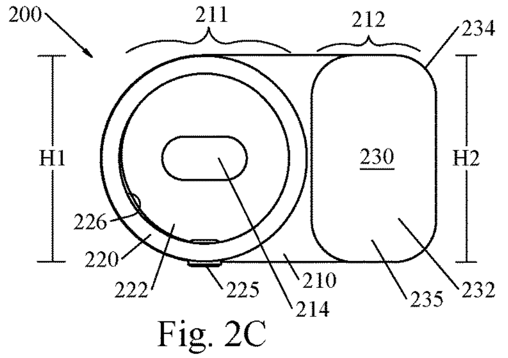
FIG. 2C illustrates a front view of the integrated sliding glass panel bumper assembly of FIG. 2A.
Figure 2D:
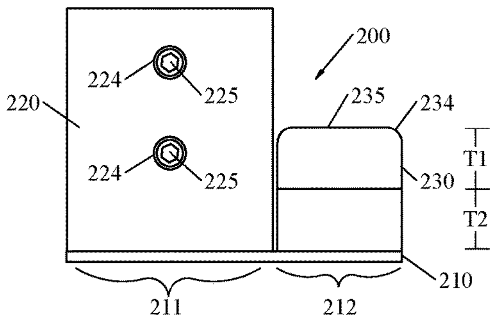
FIG. 2D illustrates a bottom view of the integrated sliding glass panel bumper assembly of FIG. 2A.

In FIG. 2C, it can be seen that a height H1 of the first portion 211 of the plate 210 is the same as the height H2 of the second portion 212 of the plate 210; however, it is contemplated that the height H1 of the first portion 211 can be greater than or less than the height H2 of the second portion 212.

Figure 2E:
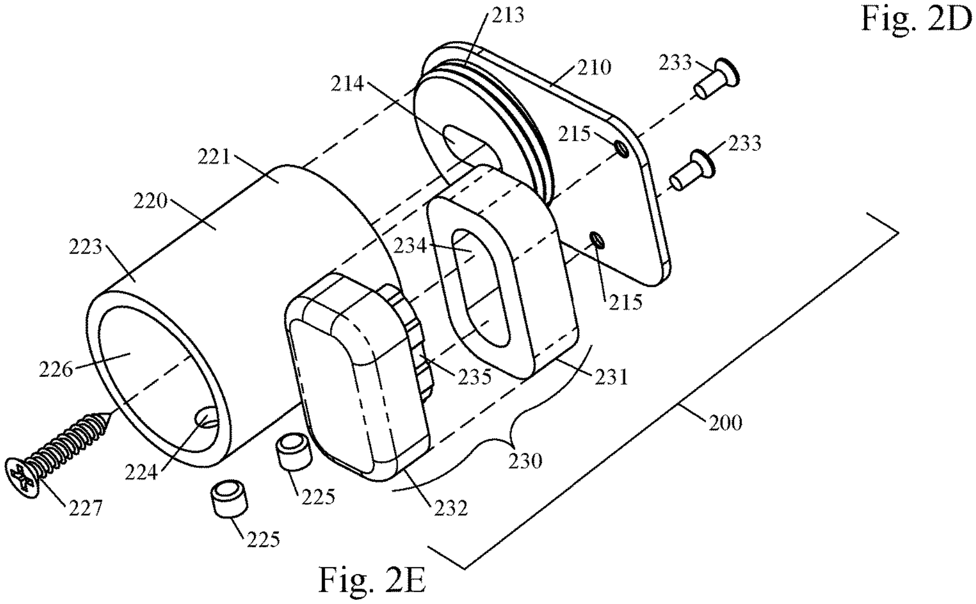
FIG. 2E illustrates an exploded perspective view of the integrated sliding glass panel bumper assembly of FIG. 2A.

In embodiments, the first portion 211, the second portion 212, or both the first portion 211 and the second portion 212 of the plate 210 can have a hole formed therein. The hole is configured for insertion of a mounting screw 227, nail, or other fastener through the hole, for mounting the plate 210 to a wall. FIGS. 2C and 2E illustrate hole 214 having a slot shape; however, it is contemplated that the hole 214 can have any shape or embodiment, such as a countersink.

The rail sleeve 220 can generally have a cross-sectional shape that matches the cross sectional shape of the top rail (e.g., top rail 106), with a hollow interior 222 that is configured to receive the end of a top rail (e.g., end 107*a* or end 107*b* of top rail 106). For top rail 106 with a circular cross sectional shape, the rail sleeve 220 is generally cylindrical in shape. For top rails having a square or rectangular cross-sectional shape, the rail sleeve 220 can generally have a square or rectangular prism shape. In some embodiments, the rail sleeve 220 can have a diameter that increases or decreases from end 221 to opposite end 223 of the rail sleeve 220. For example, the end 221 can have a diameter that is greater than a diameter of opposite end 223. Generally, the dimension of the opposite end 223 of the rail sleeve 220 is sized to mate with the end of the top rail. For example, the end 223 of the rail sleeve 220 can have an inner diameter that matches or is slightly larger than an outer diameter of the top rail 106, sized such that the top rail 106 does not move in the rail sleeve 220. In embodiments, the rail sleeve 220 can have one or more threaded holes 224 formed therein to receive set screws 225. The set screws 225 can be used to tighten and secure the end of the top rail in the hollow interior 222 of the rail sleeve 220. Alternatively, the rail sleeve 220 can be configured to connect to an end of a top rail with friction fit relationship or by compression fit of compressible members placed on the inner surface 226 of the rail sleeve 220.

The bumper 230 is configured to absorb at least a portion of the force of impact or collision of a sliding glass panel in a frameless sliding glass panel system. In FIGS. 2A to 2E, it can be seen than the bumper 230 is rectangular prism in shape; however, it is contemplated that the bumper 230 can have any other shape, such as the cylindrical shape shown in FIGS. 3A to 3E. The bumper 230 can be made of any polymeric material, any elastomeric material, or any combination of polymer material and elastomeric material.

In embodiments, the bumper 230 can include a base portion 231 and a bumper portion 232. The base portion 231 can be connected to the second portion 212 of the plate 210, for example, by sink screws 233 that extend through holes 215 formed in the second portion 212 of the plate 210 and into the base portion 231. The bumper portion 232 can connect to the base portion 231. In embodiments, the bumper portion 232 can be in press fit relationship with the base portion 231. For example, the base portion 231 can have a hollow interior 234, and the bumper portion 232 can have a protruding part 235 that fits into the hollow interior 234 of the base portion 231.

In alternative embodiments, the bumper 230 is a single piece, such as being embodied as only the bumper portion 232 that is connected to the second portion 212 of the plate 210 (e.g., via the sink screws 233). That is, sink screws 233 can extend through holes 215 formed in the second portion 212 of the plate 210 and into the bumper portion 232 of the bumper 230.

In aspects, the bumper portion 232 can have a thickness T1 of about 0.250, 0.375, or 0.500 inch (excluding the thickness of the protruding part 235). In aspects, the protruding part 235 of the bumper portion 232 can have a thickness of less than about 0.500, 0.400, 0.300, or 0.250 inch, and the hollow interior 234 can have a corresponding depth for receiving the protruding part 235. In embodiments having a base portion 231, the base portion 231 can have a thickness T2 of about 0.250, 0.375, or 0.500 inch.

In embodiments of the assembly 200 in FIGS. 2A to 2E, the bumper 230 is attached to the plate 210 but is not connected or attached to the wall (e.g., the plate 210 is attached to the wall and not the bumper 230). That is, in embodiments, there is no mounting screw 227 or other mounting device that extends through any portion of the bumper 230 and into a wall, and the bumper 230 is not otherwise affixed directly to the wall.

In FIGS. 2A to 2E, it can be seen that the bumper portion 232 of the bumper 230 has rounded edges 236 on the top surface 237; however, it is contemplated that the edges can be straight edges or any other edges known in the art with the aid of this disclosure.

FIGS. 3A to 3E illustrate various views of another embodiment of an integrated sliding glass panel bumper assembly 300. The integrated sliding glass panel bumper assembly 300 includes a plate 310, a rail sleeve 320 coupled to a first portion 311 of the plate 310, and a bumper 330 coupled to a second portion 312 of the plate 310. The plate 310 is configured to attach (or be attached) to a wall (e.g., wall 108*a* or 108*b*) of an enclosure or space, and the rail sleeve 320 is configured to receive an end of a top rail (e.g., end 107*a* or end 107*b* of top rail 106).

The plate 310 can generally be flat. The first portion 311 of the plate 310 can have a connector 313, embodied as a male threaded portion in FIG. 3E. The connector 313 can be configured to connect with an end 321 of the rail sleeve 320. The end 321 of the rail sleeve 320 can be configured with a connector, such as female threads formed on an inside surface of the rail sleeve 320, that is configured to connect with the connector 313 of the plate 310. In alternative embodiments, the connector 313 can have a female threaded portion configured to connect with the end 321 of the rail sleeve 320, and the end 321 of the rail sleeve 320 can be configured with a connector, such as male threads formed on an outside surface of the rail sleeve 320, that is configured to connect with the connector 313 of the plate 310. Other alternative embodiments contemplated that the connector 313 of the plate 310 and the connector of the rail sleeve 320 can have other types of connection (in alternative to threaded connection) such as friction fit arrangement, a holding pin, or a set screw (e.g., such as set screw 225). Yet other alternative embodiments contemplate that the plate 310 and rail sleeve 320 can be integrally formed, glued together, or welded together.

Figure 3A:
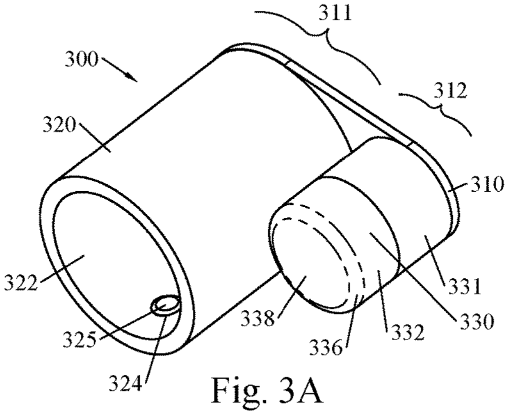
FIG. 3A illustrates a perspective view of another embodiment of an integrated sliding glass panel bumper assembly.
Figure 3B:
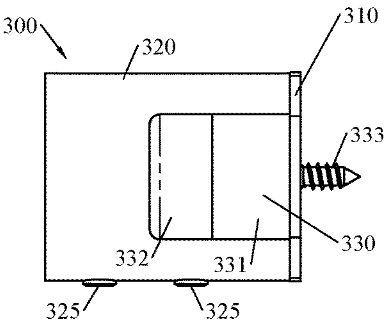
FIG. 3B illustrates a side elevational view of the integrated sliding glass panel bumper assembly of FIG. 3A.
Figure 3C:
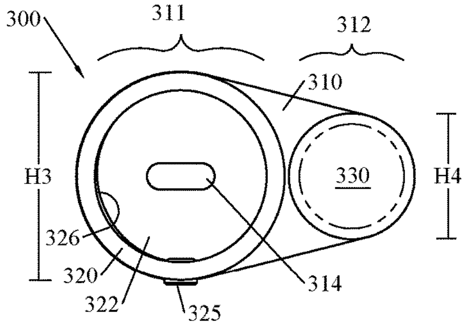
FIG. 3C illustrates a front view of the integrated sliding glass panel bumper assembly of FIG. 3A.
Figure 3D:
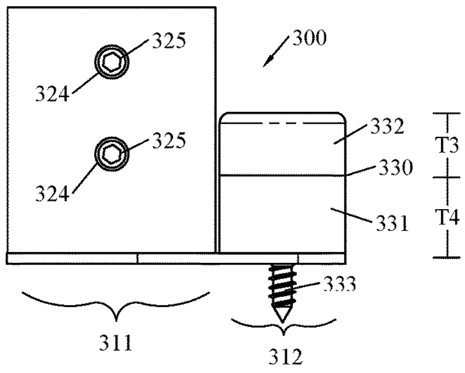
FIG. 3D illustrates a bottom view of the integrated sliding glass panel bumper assembly of FIG. 3A.

In FIG. 3C, it can be seen that a height H3 of the first portion 311 of the plate 310 is greater than the height H4 of the second portion 312 of the plate 310; however, it is contemplated that the height H3 of the first portion 311 can be equal to or less than the height H4 of the second portion 312.

Figure 3E:
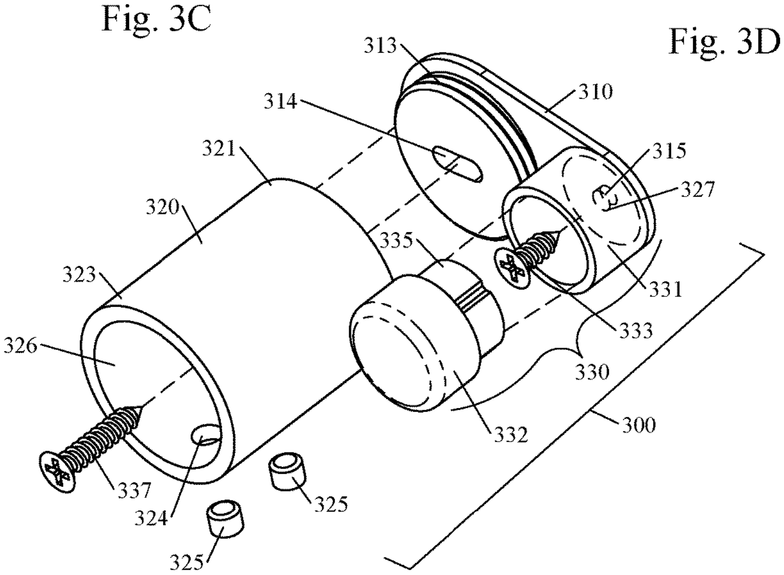
FIG. 3E illustrates an exploded perspective view of the integrated sliding glass panel bumper assembly of FIG. 3A.

In embodiments, the first portion 311, the second portion 312, or both the first portion 311 and the second portion 312 of the plate 310 can have a hole formed therein. The hole is configured for insertion of a mounting screw 337, nail, or other fastener through the hole, for mounting the plate 310 to a wall. FIGS. 3C and 3E illustrate hole 314 having a slot shape; however, it is contemplated that the hole 314 can have any shape or embodiment, such as a countersink.

The rail sleeve 320 can generally have a cross-sectional shape that matches the cross sectional shape of the top rail (e.g., top rail 106), with a hollow interior 322 that is configured to receive the end of a top rail (e.g., end 107*a* or end 107*b* of top rail 106). For top rail 106 with a circular cross sectional shape, the rail sleeve 320 is generally cylindrical in shape. For top rails having a square or rectangular cross-sectional shape, the rail sleeve 320 can generally have a square or rectangular prism shape. In some embodiments, the rail sleeve 320 can have a diameter that increases or decreases from end 321 to opposite end 323 of the rail sleeve 320. For example, the end 321 can have a diameter that is greater than a diameter of opposite end 323. Generally, the dimension of the opposite end 323 of the rail sleeve 320 is sized to mate with the end of the top rail. For example, the end 323 of the rail sleeve 320 can have an inner diameter that matches or is slightly larger than an outer diameter of the top rail 106, sized such that the top rail 106 does not move in the rail sleeve 320. In embodiments, the rail sleeve 320 can have one or more threaded holes 324 formed therein to receive set screws 325. The set screws 325 can be used to tighten and secure the end of the top rail in the hollow interior 322 of the rail sleeve 320. Alternatively, the rail sleeve 320 can be configured to connect to an end of a top rail with friction fit relationship or by compression fit of compressible members placed on the inner surface 326 of the rail sleeve 320.

The bumper 330 is configured to absorb at least a portion of the force of impact or collision of a sliding glass panel in a frameless sliding glass panel system. In FIGS. 3A to 3E, it can be seen than the bumper 330 is cylindrical in shape; however, it is contemplated that the bumper 330 can have any other shape, such as the rectangular prism shape shown in FIGS. 2A to 2E. The bumper 330 can be made of any polymeric material, any elastomeric material, or any combination of polymer material and elastomeric material.

In embodiments, the bumper 330 can include a base portion 331 and a bumper portion 332. The base portion 331 can abut with the second portion 312 of the plate 310, for example, by a mounting screw 333 that extends through a hole 327 formed in the base portion 331 of the bumper 330 and a hole 315 formed in the second portion 312 of the plate 310. In embodiments, the bumper portion 332 can connect to the base portion 331. For example, the bumper portion 332 can be in press fit relationship with the base portion 331. That is, the base portion 331 can have a hollow interior 334, and the bumper portion 332 can have a protruding part 335 that fits into the hollow interior 334 of the base portion 331.

In alternative embodiments, the bumper 330 is a single piece, such as being embodied as only the bumper portion

332 that abuts the second portion 312 of the plate 310, and is held in place by the mounting screw 333.

In aspects, the bumper portion 332 can have a thickness T3 of about 0.250, 0.375, or 0.500 inch (excluding the thickness of the protruding part 235). In aspects, the protruding part 335 of the bumper portion 332 can have a thickness of less than about 0.500, 0.400, 0.300, or 0.250 inch, and the hollow interior 334 can have a corresponding depth for receiving the protruding part 335. In embodiments having a base portion 331, the base portion 331 can have a thickness T4 of about 0.250, 0.375, or 0.500 inch.

In embodiments, the bumper 330 is connected or attached to the wall as a secondary mount, in addition to the primary mount provided by a first mounting screw that extends through the hole 314 of the first portion 311 of the plate 310. In these embodiments, the first mounting screw extends through the hole 314 in the plate 310 to attach the plate 310 to a first location on the wall, and the second mounting screw 333 extends through the bumper 330 (e.g., the base portion 331 or the bumper portion 332 of the bumper 330) and through a second hole 315 formed in the plate 310 to attach the plate 310 to a second location on the wall. In these embodiments, the first location is proximate to the second location. For example, the first location can be 0.5, 1, 1.5, 2, 2.5, 3, 3.5, 4, 4.5, or 5 cm from the second location.

In FIGS. 3A to 3E, it can be seen that the bumper portion 332 of the bumper 330 has rounded edges 336 on the top surface 338; however, it is contemplated that the edges can be straight edges or any other edges known in the art with the aid of this disclosure.

Figure 4A:
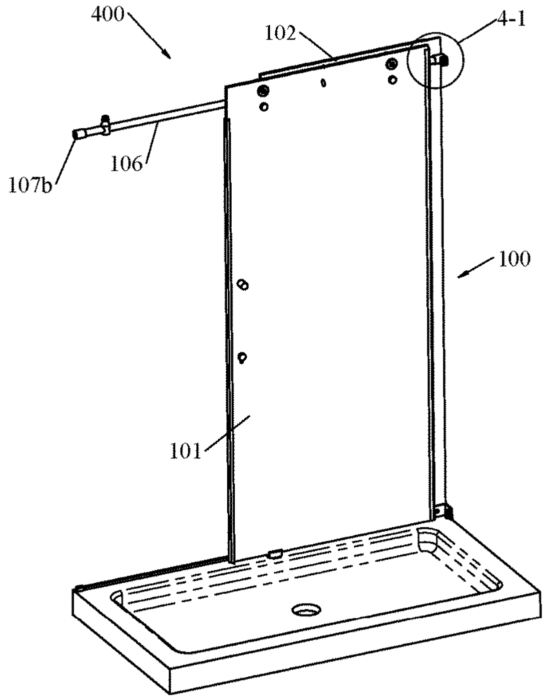
FIG. 4A illustrates a perspective view of a frameless sliding glass panel system having the integrated sliding glass panel bumper assembly of FIGS. 2A to 2E and the frameless sliding glass panel system of FIG. 1.
Figure 4B:
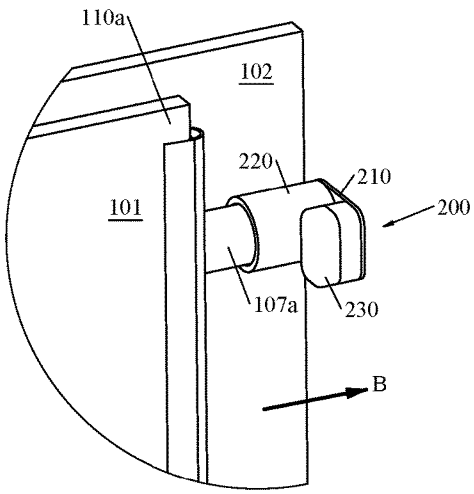
FIG. 4B illustrates an enlarged view of portion 4-1 in FIG. 4A.

FIG. 4A illustrates a perspective view of a frameless sliding glass panel system 400 having the integrated sliding glass panel bumper assembly 200 of FIGS. 2A to 2E and the frameless sliding glass panel system 100 of FIG. 1. FIG. 4B illustrates an enlarged view of portion 4-1 in FIG. 4A. Walls 108*a* and 108*b* in FIG. 1 are not shown in FIG. 4A for clarity.

Referring to FIGS. 4A and 4B, the sliding glass panel 101 is shown in front of the fixed glass panel 102, with the top rail 106 between the sliding glass panel 101 and the fixed glass panel 102. The end 107*a* of the top rail 106 can be seen as extending into and coupled with the rail sleeve 220 of the integrated sliding glass panel bumper assembly 200. The rail sleeve 220 is coupled to the plate 210 of the integrated sliding glass panel bumper assembly 200, as is the bumper 230. As the sliding glass panel 101 moved in the direction of arrow B, the side 110*a* of the sliding glass panel 101 contacts the bumper 230, and the bumper 230 absorbs at least some of the force of the sliding glass panel 101 such that not all of the force is transmitted into the wall to which the integrated sliding glass panel bumper assembly 200 is attached. While the integrated sliding glass panel bumper assembly 200 of FIGS. 2A to 2E are shown in the system 400, it is contemplated that the integrated sliding glass panel bumper assembly 300 of FIGS. 3A to 3E can also be used in other embodiments of the system 400. In some aspects, the integrated sliding glass panel bumper assembly 200 or the integrated sliding glass panel bumper assembly 300 can be used on the opposite end 107*b* of the top rail 106.

Figure 5B:
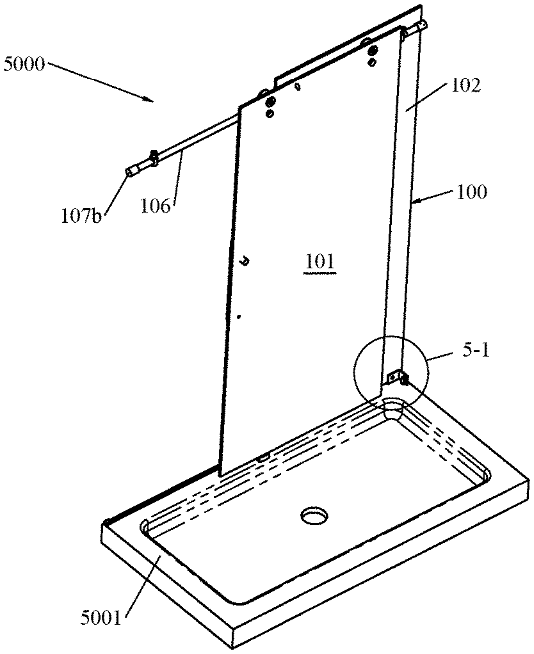
FIG. 5B illustrates a perspective view of a frameless sliding glass panel system having the integrated sliding glass panel bumper assembly of FIG. 5A and the frameless sliding glass panel system of FIG. 1.
Figure 5C:
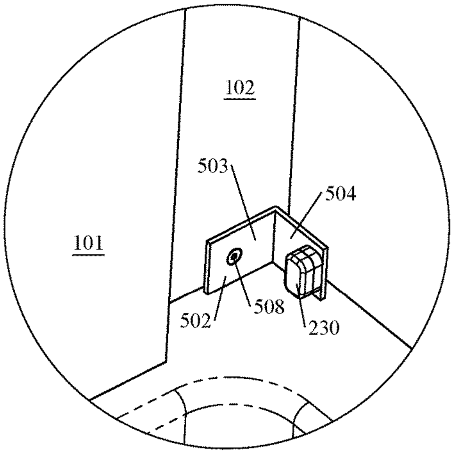
FIG. 5C illustrates an enlarged view of portion 5-A in FIG. 5B.
Figure 5A:
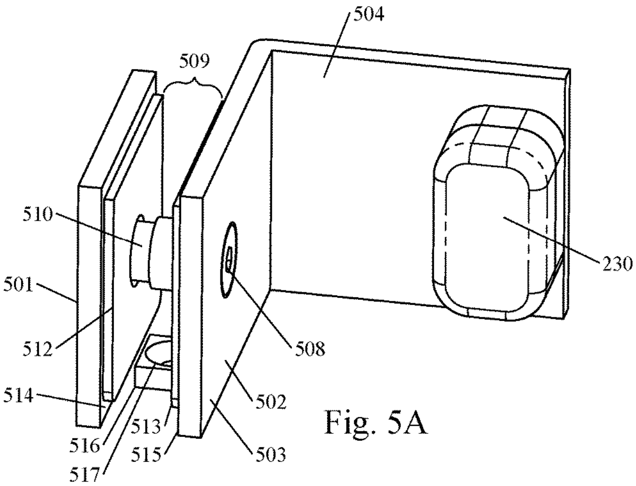
FIG. 5A illustrates a perspective view of another embodiments of an integrated sliding glass panel bumper assembly.

FIG. 5A illustrates a perspective view of another embodiments of an integrated sliding glass panel bumper assembly 500. FIG. 5B illustrates a perspective view of a frameless sliding glass panel system 5000 having the integrated sliding glass panel bumper assembly 500 of FIG. 5A and the frameless sliding glass panel system 100 of FIG. 1. FIG. 5C illustrates an enlarged view of portion 5-A in FIG. 5B.

Referring to FIGS. 5A to 5C, the integrated sliding glass panel bumper assembly 500 has a first plate 501 and a second plate 502. As can be seen, the second plate 502 has a first portion 503 that is parallel to the first plate 501 and a second portion 504 that is perpendicular to the first plate 501 and to the first portion 503 of the second plate 502. The second portion 504 can have a side 506 connected to a side 505 of the first portion 503 so as to form L-shape for the second plate 502.

The first plate 501 can generally be a flat piece of material, such as a metal used for bathroom environments. The first portion 503 and second portion 504 of the second plate 502 also each be a flat piece of material, such as the metal used for bathroom environments. The first plate 501 can have a hole 510 formed through the plate 501 (e.g., in a center of the plate 501), and the first portion 503 of the second plate 502 can have a hole 511 formed through the plate 502 (e.g., in a center of the plate 502), such that the hole 510 of the first plate 501 aligns with the hole of the second plate 502. The shape of the holes 510 and 511 can be independently selected from any shape, such as circle, square, rectangle, triangle, or other polygonal shape.

The assembly 500 can further include a connector 508 configured to couple the first plate 501 to the first portion 503 of the second plate 502 such that a space or gap 509 is formed between the first plate 501 and the first portion 503 of the second plate 502. A fixed glass panel (e.g., glass panel 102 in FIGS. 5B and 5C) can be received in the space or gap 509. The connector 508 can extend through the hole 510 in the first plate 501 and through the hole 511 in the first portion 503 of the second plate 502.

In embodiments, the first plate 501 can have a padding 512 placed on the side 514 of the first plate 501, and the second plate 502 can have a padding 513 placed on the side 515 of the first portion 503 of the second plate 502. In embodiments, the side 514 of the first plate 501 and the side 515 of the first portion 503 of the second plate 502 face one another. In further embodiments, the padding 512 faces the padding 513. The padding 512 and 513 can be made of a polymeric material or an elastomeric material, for example.

In some embodiments, the integrated sliding glass panel bumper assembly 500 can include a mounting plate 516 attached to the first plate 501, attached to the second plate 502, or attached to both the first plate 501 and the second plate 502. In FIG. 5A, the mounting plate 516 is embodied as a floor mounting plate, and has a hole 517 formed therein that is configured to receive a mounting screw (e.g., another screw similar or the same as mounting screw 227, 337, or 333) that can secure the integrated sliding glass panel bumper assembly 500 to a base or floor of the enclosure (e.g., to the shower floor 5001 in FIG. 5B).

The first plate 501 and the first portion 503 of the second plate 502 are configured to receive a portion of the fixed glass panel 102. The bumper 230 of the integrated sliding glass panel bumper assembly 500 is configured to absorb impact of the sliding glass panel 101. In FIG. 5C, the fixed glass panel 102 can be seen having a portion placed in the space or gap 509 of the integrated sliding glass panel bumper assembly 500. The bumper 230 can be seen placed on the second portion 504 of the second plate 502 in the path of movement of the sliding glass panel 101, so as to absorb at least some of the force of movement when the sliding glass panel 101 moves toward the bumper 230.

The bumper 230 can be seen as embodied as the bumper 230 of FIGS. 2A to 2E. In such embodiments, the bumper 230 can be connected to the second portion 504 of the second plate 502 via holes formed in the second portion 504 and screws that fasten to the bumper 230 (e.g., similar to holes 215 formed in plate 210 of FIG. 2E and using sink screws 233).

In embodiments, the bumper 230 is not connected to a wall. In alternative embodiments, the bumper 330 of FIGS. 3A to 3E can be used in the integrated sliding glass panel bumper assembly 500. In such embodiments, the bumper 330 can be connected to the second portion 504 of the second plate 502 via a hole formed in the bumper 330, a hole formed in the second portion 504 of the second plate 502, and a mounting screw that fastens the bumper 330 to a wall (e.g., similar to hole 315 formed in plate 310 of FIG. 3E and using mounting screw 333).

Figure 6A:
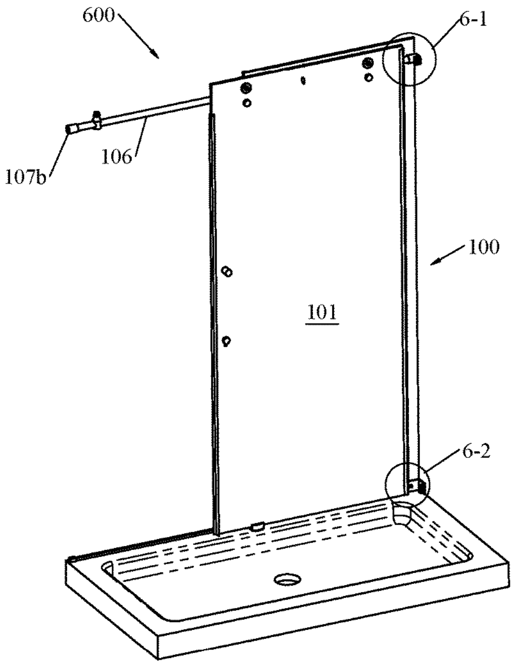
FIG. 6A illustrates a perspective view of a frameless sliding glass panel system having the integrated sliding glass panel bumper assembly of FIGS. 2A to 2E and the integrated sliding glass panel bumper assembly 500 of FIGS. 5A to 5C.
Figure 6B:
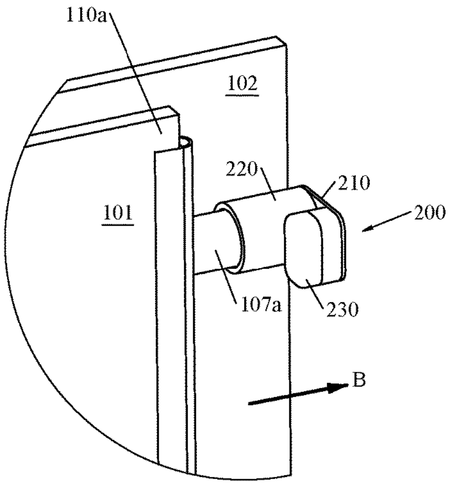
FIG. 6B illustrates an enlarged view of portion 6-1 in FIG. 6A.
Figure 6C:
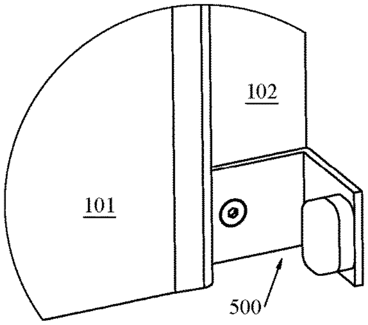
FIG. 6C illustrates an enlarged view of portion 6-2 in FIG. 6A.

FIG. 6A illustrates a perspective view of a frameless sliding glass panel system 600 having the integrated sliding glass panel bumper assembly 200 of FIGS. 2A to 2E, the integrated sliding glass panel bumper assembly 500 of FIGS. 5A to 5C, and the frameless sliding glass panel system 100 of FIG. 1. FIG. 6B illustrates an enlarged view of portion 6-1 in FIG. 6A. FIG. 6C illustrates an enlarged view of portion 6-2 in FIG. 6A. The integrated sliding glass panel bumper assembly 200 is the same as that described for FIGS. 2A to 2E, and said description is not reproduced here. Similarly, the integrated sliding glass panel bumper assembly 500 is the same as that described for FIGS. 5A to 5C, and said description is not reproduced here. Likewise, the frameless sliding glass panel system 100 is the same as that described for FIG. 1, and said description is not reproduced here.

Alternative embodiments of the frameless sliding glass panel system 600 contemplate that: i) the integrated sliding glass panel bumper assembly 300 can be used on end 107*a* of the top rail 106; ii) integrated sliding glass panel bumper assembly 200 can be used on end 107*b* of the top rail 106; iii) integrated sliding glass panel bumper assembly 300 can be used on end 107*b* of the top rail 106; iv) integrated sliding glass panel bumper assemblies 200 can be used on both ends 107*a* and 107*b* of the top rail 106; v) integrated sliding glass panel bumper assemblies 500 can be used on both ends 107*a* and 107*b* of the top rail 106; vi) there is no integrated sliding glass panel bumper assembly 200 or 300 on end 107*a* of the top rail 106; vii) there is no integrated sliding glass panel bumper assembly 200 or 300 on end 107*b* of the top rail 106; or viii) combinations thereof.

Figure 7A:
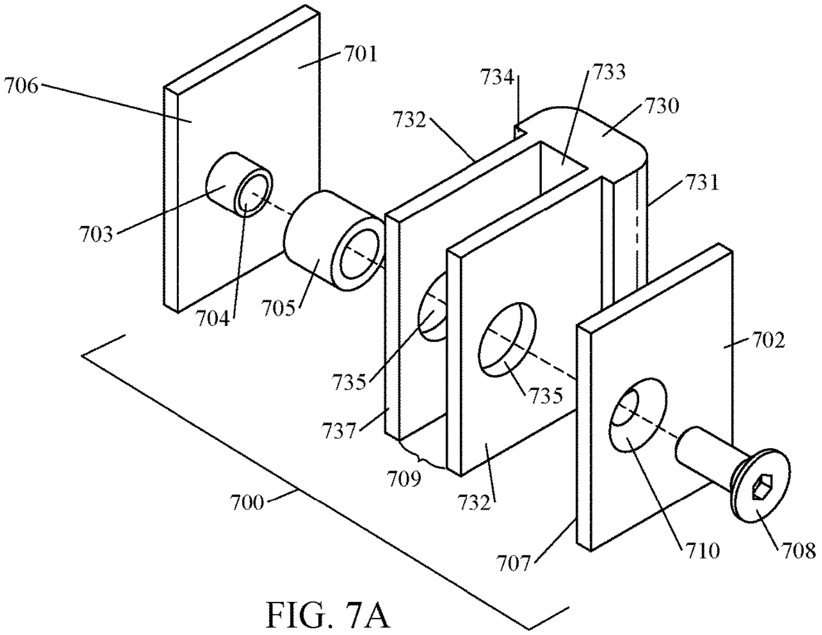
FIG. 7A illustrates an exploded view of another embodiments of an integrated sliding glass panel bumper assembly.
Figure 7B:
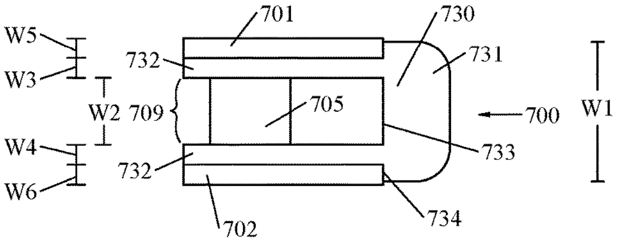
FIG. 7B illustrates a top view of another embodiment of an integrated sliding glass panel bumper assembly in FIG. 7A.
Figure 7C:
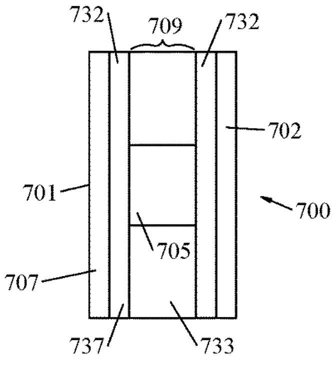
FIG. 7C illustrates an end elevational view of the integrated sliding glass panel bumper assembly in FIG. 7A.
Figure 7D:
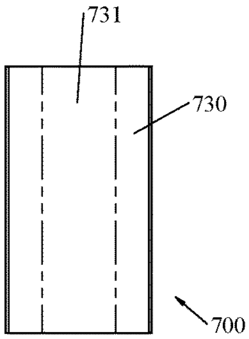
FIG. 7D illustrates an opposite end elevational view of the integrated sliding glass panel bumper assembly in FIG. 7A.
Figure 7E:
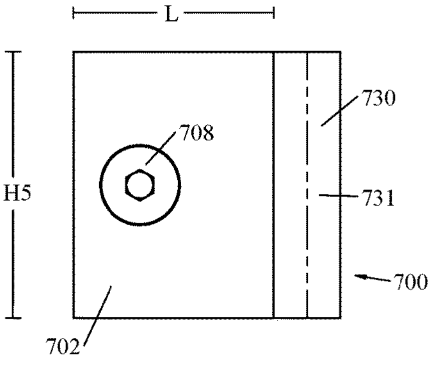
FIG. 7E illustrates a side elevational view of the integrated sliding glass panel bumper assembly in FIG. 7A.
Figure 7F:
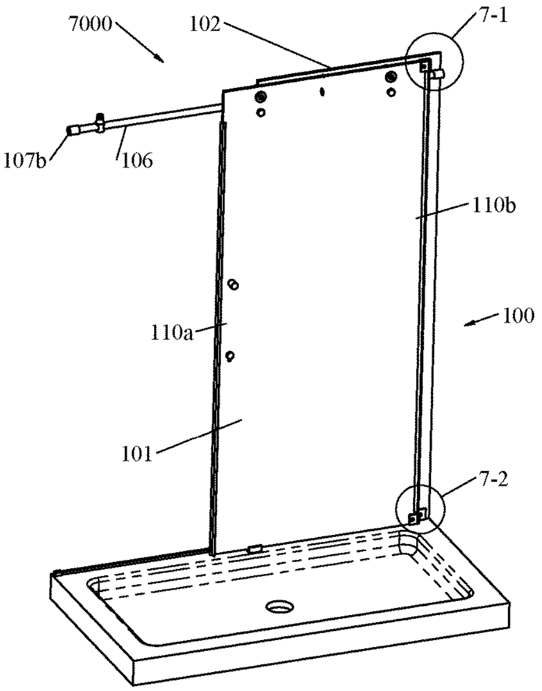
FIG. 7F illustrates a perspective view of a frameless sliding glass panel system have the integrated sliding glass panel bumper assembly of FIG. 7A and the frameless sliding glass panel system of FIG. 1.
Figure 7G:
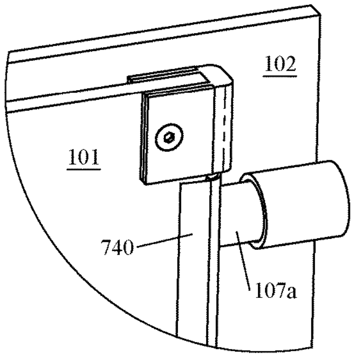
FIG. 7G illustrates an enlarged view of portion 7-1 of FIG. 7F.
Figure 7I:
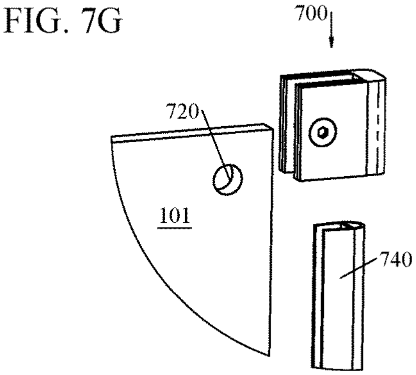
FIG. 7I illustrates an exploded perspective view of the integrated sliding glass panel bumper assembly in FIG. 7A, a sliding glass panel, and a door seal.
Figure 7H:
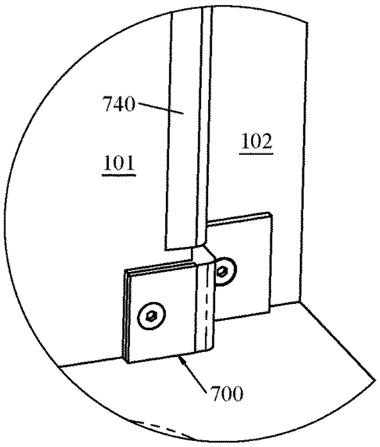
FIG. 7H illustrates an enlarged view of portion 7-2 of FIG. 7F.

FIG. 7A illustrates an exploded view of another embodiments of an integrated sliding glass panel bumper assembly 700. FIG. 7B illustrates a top view of another embodiment of an integrated sliding glass panel bumper assembly 700 of FIG. 7A. FIGS. 7C to 7E illustrate an end elevational, opposite end elevational, and side elevational views of the integrated sliding glass panel bumper assembly 700 of FIG. 7A. FIG. 7F illustrates a perspective view of a frameless sliding glass panel system 7000 having the integrated sliding glass panel bumper assembly 700 of FIG. 7A and the frameless sliding glass panel system 100 of FIG. 1. FIGS. 7G to 7H illustrate enlarged views of portions 7-1 and 7-2 in FIG. 7F. FIG. 7I illustrates an exploded perspective view of the sliding glass panel 101, the integrated sliding glass panel assembly 700, and a door seal 740.

Referring to FIGS. 7A to 7I, the integrated sliding glass panel bumper assembly 700 has a first plate 701 and a second plate 702. The first plate 701 is parallel to the second plate 702. The first plate 701 can have a coupler 703 on a side 706 of the plate 701 that can extend towards the second plate 702.

The first plate 701 can generally be a flat piece of material, such as a metal used for bathroom environments. The coupler 703 on the first plate 701 can generally be round with an opening 704 (e.g., a threaded interior) configured to receive and secure a screw or bolt 708. The coupler 703 can generally be formed of the same material as the first plate 701. The second plate 702 can also generally be a flat piece of material, such as the metal used for bathroom environments. The second plate 702 can have a hole 710 formed through the plate 702 (e.g., toward an end 707 of the plate 702), such that the hole aligns with the coupler 703 on the first plate 701. The shape of the hole 710 can be selected from any shape, such as circle, square, rectangle, triangle, or other polygonal shape.

The assembly 700 can further include a bumper 730 configured to be coupled to the sliding glass panel 101 by the first plate 701 and the second plate 702. The bumper 730 can include two mounting portions 732 integrally formed with a bumper portion 731. The two mounting portions 732 can be formed such that a space or gap 709 is formed between the two mounting portions 732. A corner of the sliding glass panel 101 can be received in the space or gap 709. Each of the two mounting portions 732 can have a hole 735 (e.g., toward an end 737 of each mounting portion 732), such that the holes 735 align with the hole 710 and coupler 703 in the second plate 702 and the first plate 701 respectively.

The bumper portion 731 of the bumper 730 is configured to absorb at least a portion of the force of impact or collision of a sliding glass panel 101 against a wall. The bumper portion 731 is rectangular prism in shape; however, it is contemplated that the bumper portion 731 can have any other shape capable of absorbing impact or collision and having the two mounting portions 732 integrally formed. The bumper portion 731 can have a width W1 equal to or greater than sum of the width W2 of the space or gap 709, the widths W3 and W4 of the two mounting portions 732, the width W5 of the first plate 701, and the width W6 of the second plate 702.

Generally, the first plate 701, the second plate 701, and the mounting portions 732 of the bumper 730 can have the same length L and height H5.

The bumper portion 731 can have a lip 734 that contacts a portion of the first plate 701 and the second plate 702. A back 733 of the bumper portion 731 that connects to the mounting portions 732 is flat so as to maximize contact surface area with the side (e.g., opposite side 110*b*) of the sliding glass panel 101 to which the assembly 700 is attached. The back 733 of the bumper portion 731 in combination with the mounting portions 732 for the shape of the space or gap 709, which in FIGS. 7A and 7B is a rectangular U-shape. The bumper 730 can be made of any polymeric material, any elastomeric material, or any combination of polymer material and elastomeric material.

The assembly 700 is configured to receive a corner of the glass panel 101 in the space or gap 709. The first plate 701 and second plate 702 can be secured to the bumper 730 by a connector, such as a screw or bolt 708. The screw or bolt 708 can pass through the hole 710 of the second plate 702, the holes 735 of the mounting portions 732, and a hole 720 in the sliding glass panel 101. The screw or bolt 708 can be received in the opening 704 of the coupler 703, and secured to the coupler 703. A collar 705 can be placed in the holes 710, 720, and 735, such that the collar 705 extends around the screw or bolt 708 after the screw or bolt 708 is passed through the holes 710, 720, and 735. The collar 705 functions to protect the glass of the sliding glass panel 101 from directly contacting the screw or bolt 708. The collar 705 can be made of the same material as the bumper 730 and serve to protect the glass panel 101 from the screw or bolt 708.

A sliding glass panel 101 can have more than one assembly 700 attached. As illustrated in FIG. 7F the glass panel 101 has a first assembly 700 attached to a top corner on side 110*b* of the glass panel 101 and a second assembly 700 attached to a bottom corner on side 110*b* of the glass panel 101. Embodiments also contemplate that a first assembly 700 can be attached to a top corner on side 110*a* of the sliding glass panel 110 and a second assembly 700 can be attached to a bottom corner on side 110*a* of the sliding glass panel 110. Embodiments also contemplate that a first assembly 700 attached to a top corner on side 110*b* of the glass panel 101, a second assembly 700 attached to a bottom corner on side 110*b* of the glass panel 101, a third assembly 700 can be attached to a top corner on side 110*a* of the sliding glass panel 110, and a fourth assembly 700 can be attached to a bottom corner on side 110*a* of the sliding glass panel 110.

Commercially available sliding glass panels have one or more door seals attached to one or both sides of the sliding glass panel. These door seals are intended to serve two purposes: to form a water seal, and to protect the raw edge (side) of the sliding glass panel from direct contact with the wall. A problem that occurs with the door seals is that the door seals are not attached to the sliding glass panel during installation for aesthetic or other reasons. Without the door seals, the side 110*b* of the sliding glass panel 101 can directly contact the wall during movement, and without any bumpers the sliding glass panel 101 can shatter or break due to impact with the wall. The integrated sliding glass panel assembly 700 provides a solution, in that, the integrated sliding glass panel assembly 700 can be used on one or both corners of the side 110*b*, side 110*a*, or both sides 110*a* and 110*b*, of the sliding glass panel 101 in a frameless sliding glass panel system 7000 so as to improve minimalist aesthetic appearance (e.g., to minimize the size of bumpers of the sliding glass panel 101) while having bumper protection. Other embodiments of the frameless sliding glass panel system 7000 can have a conventional door seal 740 attached along one or both sides 110*a* and 110*b* (e.g., illustrated on opposite side 110*b*) of the sliding glass panel 101, that is, on portions of the side(s) 110*a*/110*b* that are not covered by an integrated sliding glass panel bumper assembly 700.

It is also contemplated that an integrated sliding glass panel assembly 700 can be used on both the top corner and bottom corner of side 110*b* (and/or side 110*a*) of the sliding glass panel 101. Doing so can prevent rotation of the sliding glass panel 101 upon impact with a wall, which upon rotation, the corner without a bumper might impact that wall and cause the sliding glass panel 101 to shatter or break.

Disclosed herein also are methods for installing embodiments of the integrated sliding glass panel assemblies and methods for retrofitting a frameless sliding glass panel system with one or more embodiments of the integrated sliding glass panel assemblies disclosed herein. Description of the methods shall refer to reference numerals in the figures.

A method for installing the integrated sliding glass panel bumper assembly 200 can include attaching or securing the plate 210 to a wall. Attaching or securing the plate 210 can be performed by inserting a mounting device (e.g., mounting screw 227) through a hole 214 formed in a first portion 211 of the plate 210 (e.g., a hole 214 formed in a connector 213 of the plate 210). In some embodiments, attaching or securing the plate 210 can additionally include inserting the mounting device through the rail sleeve 220 prior to inserting the mounting device through the hole 214. In other embodiments, the method can additionally include attaching the end 221 of the rail sleeve 220 to the connector 213 of the plate 210 after inserting the mounting device into the hole 214. The method can additionally include inserting an end 107*a* of a top rail 106 into the hollow interior 222 of the rail sleeve 220, and optionally, securing the end 107*a* of the top rail 106 in the rail sleeve 220 by tightening one or more set screws 225 against the outer surface of the end 107*a* of the top rail 106. Embodiments of the above method are performed with the bumper 230 being connected to the plate 210 at the point of manufacture, so that installation of the mounting hardware for the top rail 106 (i.e., the rail sleeve 220 of the integrated sliding glass panel bumper assembly 200) necessarily installs the bumper 230. That is, a person installing the integrated sliding glass panel bumper assembly 200 will automatically install the bumper 230 when installing the mount (the rail sleeve 220 and first portion 211 of the plate 210) for the top rail 106 because the bumper 230 is already affixed to the plate 210 when in the installation kit that is purchased and used for installation.

A method for retrofitting a frameless sliding glass panel system 100 with the integrated sliding glass panel bumper assembly 200 can include removing the top rail 106 from a flange mount 109*a*, removing the flange mount 109*a* from the wall, and attaching or securing the plate 210 to the wall. Attaching or securing the plate 210 can be performed by inserting a mounting device (e.g., mounting screw 227) through a hole 214 formed in a first portion 211 of the plate 210 (e.g., a hole 214 formed in a connector 213 of the plate 210). In some embodiments, attaching or securing the plate 210 can additionally include inserting the mounting device through the rail sleeve 220 prior to inserting the mounting device through the hole 214. In other embodiments, the method for retrofitting can additionally include attaching the end 221 of the rail sleeve 220 to the connector 213 of the plate 210 after inserting the mounting device into the hole 214. The method for retrofitting can additionally include inserting an end 107*a* of a top rail 106 into the hollow interior 222 of the rail sleeve 220, and optionally, securing the end 107 a of the top rail 106 in the rail sleeve 220 by tightening one or more set screws 225 against the outer surface of the end 107*a* of the top rail 106. Embodiments of the above method for retrofitting are performed with the bumper 230 being connected to the plate 210 at the point of manufacture, so that installation of the mounting hardware for the top rail 106 (i.e., the rail sleeve 220 of the integrated sliding glass panel bumper assembly 200) necessarily installs the bumper 230. That is, a person installing the integrated sliding glass panel bumper assembly 200 will automatically install the bumper 230 when installing the mount (the rail sleeve 220 and first portion 211 of the plate 210) for the top rail 106 because the bumper 230 is already affixed to the plate 210 when in the installation kit that is purchased and used for installation.

A method for installing the integrated sliding glass panel bumper assembly 300 can include attaching or securing the plate 310 to a wall. Attaching or securing the plate 310 can include inserting a mounting device (e.g., mounting screw 337) through a hole 314 formed in a first portion 311 of the plate 310 (e.g., a hole 314 formed in a connector 313 of the plate 310). In some embodiments, attaching or securing the plate 310 can additionally include inserting the mounting device through the rail sleeve 320 prior to inserting the mounting device through the hole 314. In other embodiments, the method for installing can additionally include attaching the end 321 of the rail sleeve 320 to the connector 313 of the plate 310 after the mounting device is inserted into the hole 314. In some embodiments, attaching or securing the plate 310 can additionally include inserting a second mounting device (e.g., a second mounting screw 333) through a hole 315 formed in a second portion 312 of the plate 310 and a hole 327 formed in the bumper 330. The hole 327 can be formed in the base portion 331 of the bumper 330 or in the bumper portion 332 (for embodiments that only use the bumper portion 332 as the bumper 330). For embodiments that utilize the base portion 331, the method can additionally include pressing the bumper portion 332 onto the base portion 331 of the bumper 330.

The method for installing can additionally include inserting an end 107*a* of a top rail 106 into the hollow interior 322 of the rail sleeve 320, and optionally, securing the end 107*a* of the top rail 106 in the rail sleeve 320 by tightening one or more set screws 325 against the outer surface of the end 107*a* of the top rail 106.

In some embodiments, the bumper 330 (e.g., the base portion 331 for embodiments having both the base portion 331 and bumper portion 332, or the bumper portion 332 for embodiments that do not utilize the base portion 331), can be connected to the plate 310 (e.g., by adhesive) at the point of manufacture, so that installation of the mounting hardware for the top rail 106 (i.e., the rail sleeve 320 of the integrated sliding glass panel bumper assembly 300) necessarily installs the bumper 330 or at least the base portion 331 of the bumper 330. That is, a person installing the integrated sliding glass panel bumper assembly 300 will automatically install the bumper 330 or at least a portion (e.g., base portion 331) of the bumper 330 when installing the mount (the rail sleeve 320 and first portion 311 of the plate 310) for the top rail 106 because the bumper 330 (or at least the base portion 331) is already affixed to the plate 310 when in the installation kit that is purchased and used for installation.

In some embodiments, the bumper 330 can be configured to hold the mounting screw 333 in the hollow interior 334 of the base portion 331 and in the protruding part 335 of the bumper portion 332, and for installation, the bumper portion 332 can be removed from the base portion 331 so that the mounting screw 333 can be secured to a wall, and the bumper portion 332 can then be reapplied to the base portion 331. In this embodiment of assembly 300 and method, attaching or securing the bumper 330 to the wall is optional, and the bumper 330 is automatically installed even through the secondary mount (i.e., the mounting screw 333) is not utilized for the assembly 300.

A method for retrofitting a frameless sliding glass panel system with the integrated sliding glass panel bumper assembly 300 can include removing the top rail 106 from a flange mount 109*a*, removing the flange mount 109*a* from the wall, and attaching or securing the plate 310 to the wall. Attaching or securing the plate 310 can include inserting a mounting device (e.g., mounting screw 337) through a hole 314 formed in a first portion 311 of the plate 310 (e.g., a hole 314 formed in a connector 313 of the plate 310). In some embodiments, attaching or securing the plate 310 can additionally include inserting the mounting device through the rail sleeve 320 prior to inserting the mounting device through the hole 314. In other embodiments, the method for retrofitting can additionally include attaching the end 321 of the rail sleeve 320 to the connector 313 of the plate 310 after the mounting device is inserted into the hole 314. In some embodiments, attaching or securing the plate 310 can additionally include inserting a second mounting device (e.g., a second mounting screw 333) through a hole 315 formed in a second portion 312 of the plate 310 and a hole 327 formed in the bumper 330. The hole 327 can be formed in the base portion 331 of the bumper 330 or in the bumper portion 332 (for embodiments that only use the bumper portion 332 as the bumper 330). For embodiments that utilize the base portion 331, the method for retrofitting can additionally include pressing the bumper portion 332 onto the base portion 331 of the bumper 330.

The method for retrofitting can additionally include inserting an end 107*a* of a top rail 106 into the hollow interior 322 of the rail sleeve 320, and optionally, securing the end 107*a* of the top rail 106 in the rail sleeve 320 by tightening one or more set screws 325 against the outer surface of the end 107*a* of the top rail 106.

A method for installing the integrated sliding glass panel bumper assembly 500 can include attaching or securing the mounting plate 516 to base or floor of an enclosure. Attaching or securing the plate 310 can include inserting a mounting device (e.g., mounting screw 337) through a hole 314 formed in a first portion 311 of the plate 310 (e.g., a hole 314 formed in a connector 313 of the plate 310). In some embodiments, attaching or securing the plate 310 can additionally include inserting the mounting device through the rail sleeve 320 prior to inserting the mounting device through the hole 314. In other embodiments, the method for installing can additionally include attaching the end 321 of the rail sleeve 320 to the connector 313 of the plate 310 after the mounting device is inserted into the hole 314. In some embodiments, attaching or securing the plate 310 can additionally include inserting a second mounting device (e.g., a second mounting screw 333) through a hole 315 formed in a second portion 312 of the plate 310 and a hole 327 formed in the bumper 330. The hole 327 can be formed in the base portion 331 of the bumper 330 or in the bumper portion 332 (for embodiments that only use the bumper portion 332 as the bumper 330). For embodiments that utilize the base portion 331, the method can additionally include pressing the bumper portion 332 onto the base portion 331 of the bumper 330.

A method for retrofitting a frameless sliding glass panel system 100 with an integrated sliding glass panel bumper assembly 500 can include removing a glass clamp from a fixed glass panel 102 of the frameless sliding glass panel system 100, and securing attaching or securing the first plate 501 and the first portion 503 of the second plate 502 of the integrated sliding glass panel bumper assembly 500 to the fixed glass panel 102. In the method, the connector 508 of the integrated sliding glass panel bumper assembly 500 can couple the first plate 501 to the first portion 503 of the second plate 502 such that the fixed glass panel 102 is attached or secured in a gap 509 that is formed between the first plate 501 and the 503 first portion of the second plate 502.

A method for installing the integrated sliding glass panel bumper assembly 700 can include sliding the mounting portions 732 of the bumper 730 over a corner of a sliding glass panel 101, placing the first plate 701 over one of the mounting portions 732, placing the second plate 702 over the other of the mounting portions 32, and attaching or securing the mounting portions 732, the first plate 701, and the second plate 702 to the corner of the sliding glass panel 101. Attaching or securing the assembly 700 can include inserting a connector (e.g., screw or bolt 708) through the hole 710 formed in the second plate 702, the holes 735 in the mounting portions 732, and the hole 720 in the sliding glass panel 101, and securing the connector in the assembly 700. The connector can be received in and secured to the threaded coupler 703 connected to the first plate 701. In some embodiments, a collar 705 can be placed in the hole 720 of the sliding glass panel 101, and attaching or securing the assembly 700 can additionally include inserting the mounting device through the collar 705.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, methods, or steps.

What is claimed is:

1. An integrated sliding glass panel bumper assembly comprising:

a plate;

a rail sleeve coupled to a first portion of the plate, wherein the rail sleeve has a hollow interior that is configured to receive an end of a top rail of a frameless sliding glass panel system; and a bumper coupled to a second portion of the plate, wherein the bumper comprises a base portion and a bumper portion, wherein the base portion is connected to the plate, wherein the bumper portion is connected to the base portion.

2. The integrated sliding glass panel bumper assembly of claim 1, wherein the bumper portion is in press fit relationship with the base portion.

3. The integrated sliding glass panel bumper assembly of claim 1, wherein the base portion has a hollow interior, wherein the bumper portion has a protruding part that fits into the hollow interior of the base portion.

4. The integrated sliding glass panel bumper assembly of claim 1, further comprising:

a mounting screw configured to extend through a hole in the first portion of the plate to attach the plate to a location on a wall.

5. The integrated sliding glass panel bumper assembly of claim 1, wherein the bumper is attached to the plate and not directly connected to the wall.

6. The integrated sliding glass panel bumper assembly of claim 1, further comprising:

a first mounting screw configured to extend through a first hole in the first portion of the plate to attach the plate to a first location on a wall; and a second mounting screw configured to extend through the bumper and through a second hole in the second portion of the plate to attach the plate to a second location on the wall.

7. The integrated sliding glass panel bumper assembly of claim 1, wherein the bumper is configured to absorb impact of a sliding glass panel.

8. The integrated sliding glass panel bumper assembly of claim 1, wherein an end of the rail sleeve is connected to the plate.

9. The integrated sliding glass panel bumper assembly of claim 1, wherein the first portion of the plate comprises a first connector and the end of the rail sleeve comprises a second connector, wherein the first connector is configured to connect with the second connector.

* * * * *